United States Patent
Itomitsu et al.

(10) Patent No.: US 6,947,769 B1
(45) Date of Patent: Sep. 20, 2005

(54) RADIO BASE STATION DEVICE AND RADIO COMMUNICATION METHOD

(75) Inventors: Fujio Itomitsu, Tokyo (JP); Kouichi Komawaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 483 days.

(21) Appl. No.: 10/129,820

(22) PCT Filed: Sep. 28, 2000

(86) PCT No.: PCT/JP00/06690

§ 371 (c)(1),
(2), (4) Date: May 9, 2002

(87) PCT Pub. No.: WO02/28132

PCT Pub. Date: Apr. 4, 2002

(51) Int. Cl.$^7$ ................................................. H04B 1/38
(52) U.S. Cl. .................... 455/561; 455/562.1; 455/502
(58) Field of Search ............................... 455/560, 561, 455/562.1, 502, 102, 119, 103, 90.3; 370/509, 370/527, 335

(56) References Cited

U.S. PATENT DOCUMENTS

| | | | |
|---|---|---|---|
| 5,243,598 A | | 9/1993 | Lee |
| 5,349,694 A | * | 9/1994 | Kawano et al. ........... 455/562.1 |
| 5,561,701 A | * | 10/1996 | Ichikawa ..................... 455/502 |
| 6,097,735 A | * | 8/2000 | Nemoto ...................... 370/509 |
| 6,101,399 A | * | 8/2000 | Raleigh et al. ............. 455/561 |
| 6,175,737 B1 | * | 1/2001 | Kao .......................... 455/562.1 |
| 6,363,086 B1 | * | 3/2002 | Lindqvist et al. ........... 370/527 |
| 6,396,823 B1 | * | 5/2002 | Park et al. .................. 455/561 |
| 6,609,007 B1 | * | 8/2003 | Eibling et al. .............. 455/561 |
| 2003/0162566 A1 | * | 8/2003 | Shapira et al. ........... 455/562.1 |
| 2004/0142728 A1 | * | 7/2004 | Tari et al. .................... 455/561 |

FOREIGN PATENT DOCUMENTS

| | | |
|---|---|---|
| JP | 05-160783 | 6/1993 |
| JP | 06-077890 | 3/1994 |
| JP | 10-94053 | 4/1998 |
| JP | 11-112364 | 4/1999 |
| WO | 98/13956 | 4/1998 |
| WO | WO 00/39943 | 7/2000 |

OTHER PUBLICATIONS

Patent Abstracts of Japan, JP 5-160783, Jun. 25, 1993.
Patent Abstracts of Japan, JP 6-77890, Mar. 18, 1994.
Patent Abstracts of Japan, JP 11-112364, Apr. 23, 1999.

* cited by examiner

Primary Examiner—Lana Le
(74) Attorney, Agent, or Firm—Oblon, Spivak, McClelland, Maier & Neustadt, P.C.

(57) ABSTRACT

A base transceiver station includes a baseband signal processor outputting a frequency notification signal indicating a carrier frequency for modulating a baseband signal, in combination with a baseband signal and a radio transmitter and receiver modulating the baseband signal from the baseband signal processor with the carrier frequency designated by the frequency notification signal so as to produce a radio transmission signal. By allowing the baseband signal processor to output the baseband signal and the frequency notification signal to the radio transmitter and receiver, the radio transmitter and receiver is immediately informed of the carrier frequency for modulation of the arriving baseband signal so that the radio transmitter and receiver is capable of generating a radio transmission signal efficiently and properly.

6 Claims, 5 Drawing Sheets

RADIO BASE STATION DEVICE AND RADIO COMMUNICATION METHOD

TECHNICAL FIELD

The present invention relates to a base transceiver station and a radio communication method of a multi-carrier type in which a baseband signal is modulated with a carrier frequency for radio transmission.

BACKGROUND ART

FIG. 2 shows an example of a base transceiver station of a code division multiple access (CDMA) type. The base transceiver station comprises antennas 21 and 22, a radio transmitter and receiver (TRX) 24, a baseband signal processor (BB) 25 and a call processing controller 26.

In this base transceiver station, a signal is received via the antennas 21 and 22. The received signal is converted into a baseband signal by the radio transmitter and receiver 24. The baseband signal processor 25 subjects the baseband signal to spectrum despreading, error correction and the like before transmitting it to a wire network. A signal received from the wire network is subject to spectrum spreading by the baseband signal processor 25. The radio transmitter and receiver 24 produces a radio transmission signal by modulating the spread signal with a carrier of a predetermined frequency and transmits the modulated signal via the antennas 21 and 22.

In such a base transceiver station of a CDMA system, complex processes including multiplexing of multiple-channel signals and multiplexing of a variety of signals including a voice signal and a data signal are necessary. Particularly, in a multi-carrier system, it is required that the radio transmitter and receiver 24 perform complex processes including using different carrier frequencies for different baseband signals.

In the related art, the call processing controller 26 is configured to notify the radio transmitter and receiver 24 of the carrier frequency to be used for each of the different baseband signals so that the radio transmitter and receiver 24 modulates the baseband signal with the desired frequency in accordance with the notification. Thus, it is ensured that different carrier frequencies are used for different baseband signals.

The frequency notification procedure as described above requires complex processes in that it is necessary for the call processing controller 26 to notify the radio transmitter and receiver 24 of the carrier frequency to be used for the baseband signal arriving at the radio transmitter and receiver 24 in advance of modulation, and for the radio transmitter and receiver 24 to modulate the arriving baseband signal with a proper carrier frequency.

DISCLOSURE OF THE INVENTION

An object of the present invention is to provide a base transceiver station and a radio communication method capable of efficiently and properly modulating a baseband signal with a desired carrier frequency in a simple process.

The present invention provides a base transceiver station comprising:

a baseband signal processor outputting a baseband signal and a frequency notification signal indicating a carrier frequency for modulation of the baseband signal; and
a radio transmitter and receiver modulating the baseband signal from the baseband signal processor with the carrier frequency indicated by the frequency notification signal so as to generate a radio transmission signal.

Accordingly, the baseband signal processor outputs the frequency notification signal as well as the baseband signal to the radio transmitter and receiver so that the radio transmitter and receiver is capable of instantaneously identifying the carrier frequency to be used for modulation of the arriving baseband signal so that the radio transmission signal is produced efficiently and properly.

The baseband signal processor may output the frequency notification signal to the radio transmitter and receiver via a signal line for transmission of a synchronization signal.

Accordingly, since the frequency notification signal is output via the signal line for transmission of the synchronization signal, it is not necessary to provide a separate signal line for frequency notification so that the construction of the station is simplified.

The baseband signal processor may output a parity signal to the radio transmitter and receiver via the signal line for transmission of the synchronization signal.

Accordingly, the parity signal is output via the signal line for transmission of the synchronization signal in addition to the frequency notification signal so that it is not necessary to provide a separate signal line for the parity signal and the construction of the station is simplified.

The present invention provides a radio communication method comprising the steps of:

assigning one of a plurality of carrier frequencies to a baseband signal, based on a result of call process;

transmitting a baseband signal and a frequency notification signal indicating the carrier frequency assigned to the baseband signal, to a radio transmitter and receiver;

generating a radio transmission signal by modulating in the radio transmitter and receiver the baseband signal with the carrier frequency indicated by the frequency notification signal; and generating the radio transmission signal thus generated.

Accordingly, the radio transmission signal is generated efficiently and properly by outputting the baseband signal and the frequency notification signal. Since the carrier frequency is assigned to the baseband signal based on the information obtained in the call process, it is ensured that the carrier frequency is assigned properly.

BEST MODE FOR CARRYING OUT THE INVENTION

Hereinafter, various embodiments of the present invention will be described with reference to the drawings.

Figure 1:
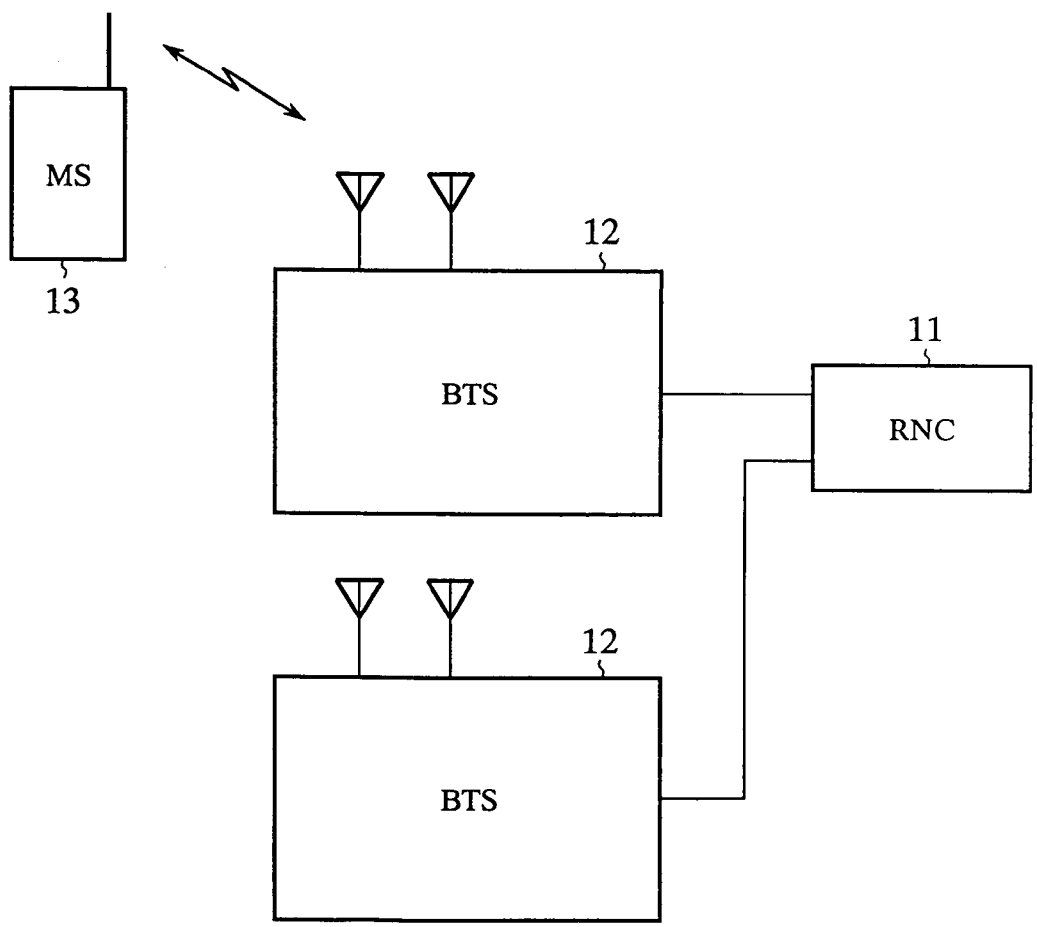
FIG. 1 is a block diagram showing an electrical construction of a radio communication system according to an embodiment of the present invention.

FIG. 1 is a block diagram showing an electrical construction of a radio communication system according to an embodiment of the present invention. A radio network controller (RNC) 11 is connected to a plurality of base transceiver stations (BTS) 12 so as to control the base transceiver stations 12. The base transceiver station 12 communicates with a mobile station 13 using a radio signal and communicates with the radio network controller 11 over a wire transmission channel.

With this construction, a signal from the mobile station 13 is multiplexed by the base transceiver station 12 accommodating the mobile station 13. Signals from a plurality of base transceiver stations 12 are in turn multiplexed by the radio network controller 11 so that the signal from the mobile station 13 is transmitted to another radio terminal or a stationary terminal. It is thus ensured that voice communication or data transmission between a plurality of terminals is enabled.

Figure 2:
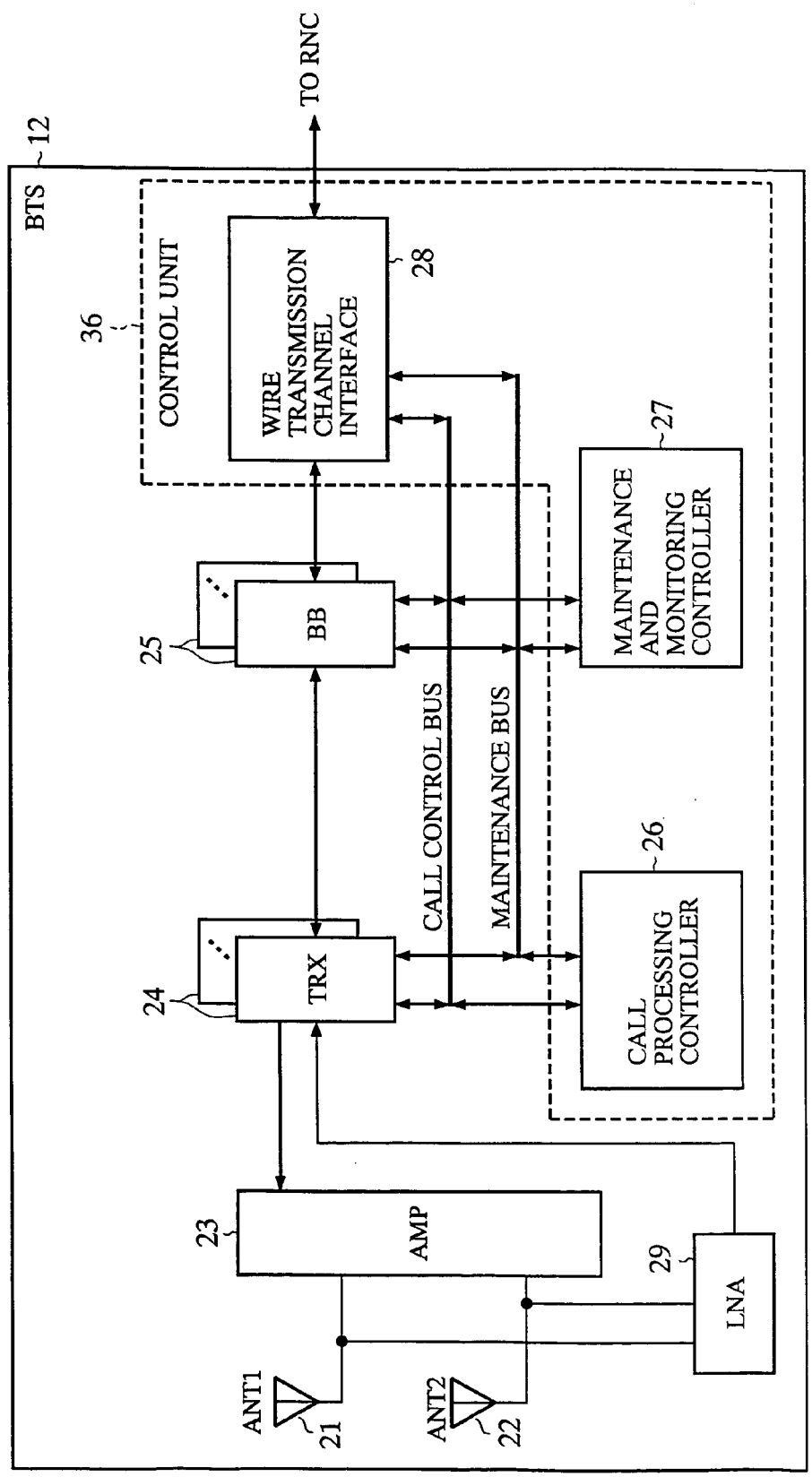
FIG. 2 is a block diagram showing an electrical construction of a base transceiver station of FIG. 1.

FIG. 2 is a block diagram showing an electrical construction of the base transceiver station 12 of FIG. 1. The base transceiver station 12 is provided with an antenna (ANT1) 21, an antenna (ATN2) 22, an amplifier 23, a plurality of radio transmitter and receivers (TRX) 24, a plurality of baseband signal processors (BB) 25, and a control unit 36 including a call processing controller 26, a maintenance and monitoring controller 27 and a wire transmission channel interface 28.

The antennas 21 and 22 constitute a pair for transmission diversity and reception diversity. The amplifier 23 amplifies a transmission signal from the radio transmitter and receiver 24 to a predetermined level before delivering the amplified signal to the antennas 21 and 22. The amplifier 23 also amplifies a signal received via the antennas 21 and 22 to a predetermined level before delivering the amplified signal to the radio transmitter and receiver 24. The radio transmitter and receiver 24 modulates the signal from the baseband signal processor 25 with one of a plurality of (for example, four) carrier frequencies before outputting the modulated signal to the amplifier 23. The radio transmitter and receiver 24 also subjects the signal received via the antennas 21 and 22, and via a low noise amplifier 29 to synchronous detection before outputting it to the baseband signal processor 25.

The baseband signal processor 25 is provided with various functions for baseband processes. More specifically, the baseband signal processor 25 subjects transmission data to error correction encoding, frame construction, data modulation, spectrum spreading and the like. A received signal undergoes spectrum despreading, chip synchronization, error correction decoding, data separation and maximal ratio combining performed in concurrence with diversity handover.

The call processing controller 26 has a call process application built therein and communicates with the radio network controller 11 using a call processing control signal so as to manage, set and release radio transmission channels, monitor a call process and control calls. The maintenance and monitoring controller 27 has a maintenance and monitoring control application built therein and communicates with the radio network controller 11 using a maintenance and monitoring control signal so as to manage the status of the base transceiver station 12, manage the history of status change of the base transceiver station 12, control the status of the base transceiver station 12 and perform remote file transmission. The wire transmission channel interface 28 is provided with a wire transmission channel terminating function.

A description will now be given of upstream signal transmission in the construction described above. The radio signal from the radio terminal is received by the antennas 21 and 22 of the base transceiver station 12, amplified by the low noise amplifier 29 and processed by the radio transmitter and receiver 24. More specifically, each of an I-component and a Q-component of the received radio signal is subject to synchronous detection so as to produce an I baseband signal and a Q baseband signal orthogonal to each other. The isolated baseband signals are then subject to spectrum despreading by the baseband signal processor 25. The signal recovered by the despreading is transmitted to the radio network controller 11 via the wire transmission channel interface 28.

A description will now be given of a downstream signal. The signal from the radio network controller 11 is separated into the I-component and the Q-component for spreading modulation by the baseband signal processor 25 before being transmitted to the radio transmitter and receiver 24. In this process, the call processing controller 26 notifies the baseband signal processing unit 25 of the carrier frequency for modulating the signal stream being processed, based on information obtained in the call process. The baseband signal processor 25 transmits a frequency notification signal indicating the designated carrier frequency to the radio transmitter and receiver 24 in combination with the signal stream being processed. The signal stream (I, Q) from the baseband signal processor 25 is subject to quadrature modulation by the radio transmitter and receiver 24 using the carrier having the frequency indicated by the frequency notification signal. The modulated signal is amplified by the amplifier 23 before being transmitted via the antennas 21 and 22.

A brief description will be given of the call process. When the mobile station 13 accesses the circuit, the mobile station 13 selects from a plurality of carrier frequencies arriving from the base transceiver station 12 the frequency characterized by the largest received power intensity. The call processing controller 26 of the base transceiver station 12 secures a radio circuit of the carrier frequency selected by the mobile station 13 and also provides radio circuit information indicating the secured circuit to the baseband signal processor 25. The carrier frequency information contained in the radio circuit information thus provided is coupled with the respective baseband signal and output to the radio transmitter and receiver 24.

Thus, since the baseband signal processor 25 outputs not only the baseband signal but also the carrier frequency information to the radio transmitter and receiver 24, the radio transmitter and receiver 24 is capable of instantaneously identifying the carrier frequency with which to modulate the arriving baseband signal so as to produce the radio transmission signal efficiently and properly. By configuring the call processing controller 26 to assign the carrier frequency to the baseband signal based on the information obtained in the call process, it is ensured that the carrier frequency is assigned properly.

Figure 3:
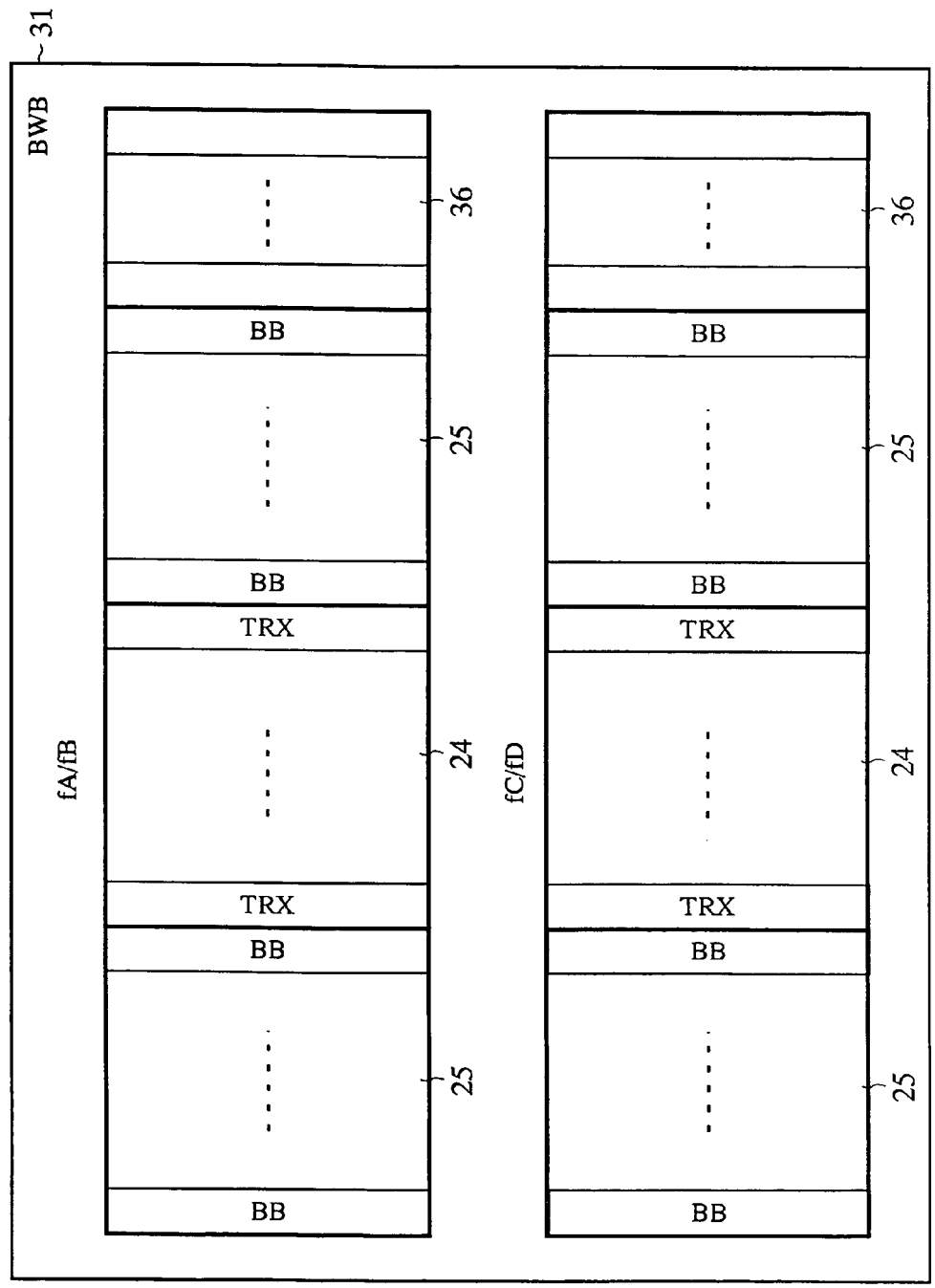
FIG. 3 shows a construction of a base transceiver station of FIG. 2.

FIG. 3 shows a physical construction of a base transceiver station of FIG. 2. The radio transceiver (TRX) 24, the baseband signal processor (BB) 25, the call processing controller 26, the maintenance and monitoring controller 27 and the wire transmission channel interface 28 are implemented by respective printed circuit boards of a card configuration. The housing of the base transceiver station is provided with shells for accommodating the cards. The back plane of the base transceiver station is provided with a backwired board (BWB) 31 for mutual connection between the cards.

The radio transmitter and receiver 24 accommodated in the upper shell is responsible for modulation at one of carrier frequencies fA and fB. The radio transmitter and receiver 24 accommodated in the lower shell is responsible for modulation at one of the carrier frequencies fC and fD. All the baseband signal processor 25 accommodated in the upper and lower shells are adapted for any of the four (A–D) carrier frequencies. Instructions from the call processing controller 26 enable dynamic assignment of the carrier frequency to the baseband signal processor 25.

Figure 4:
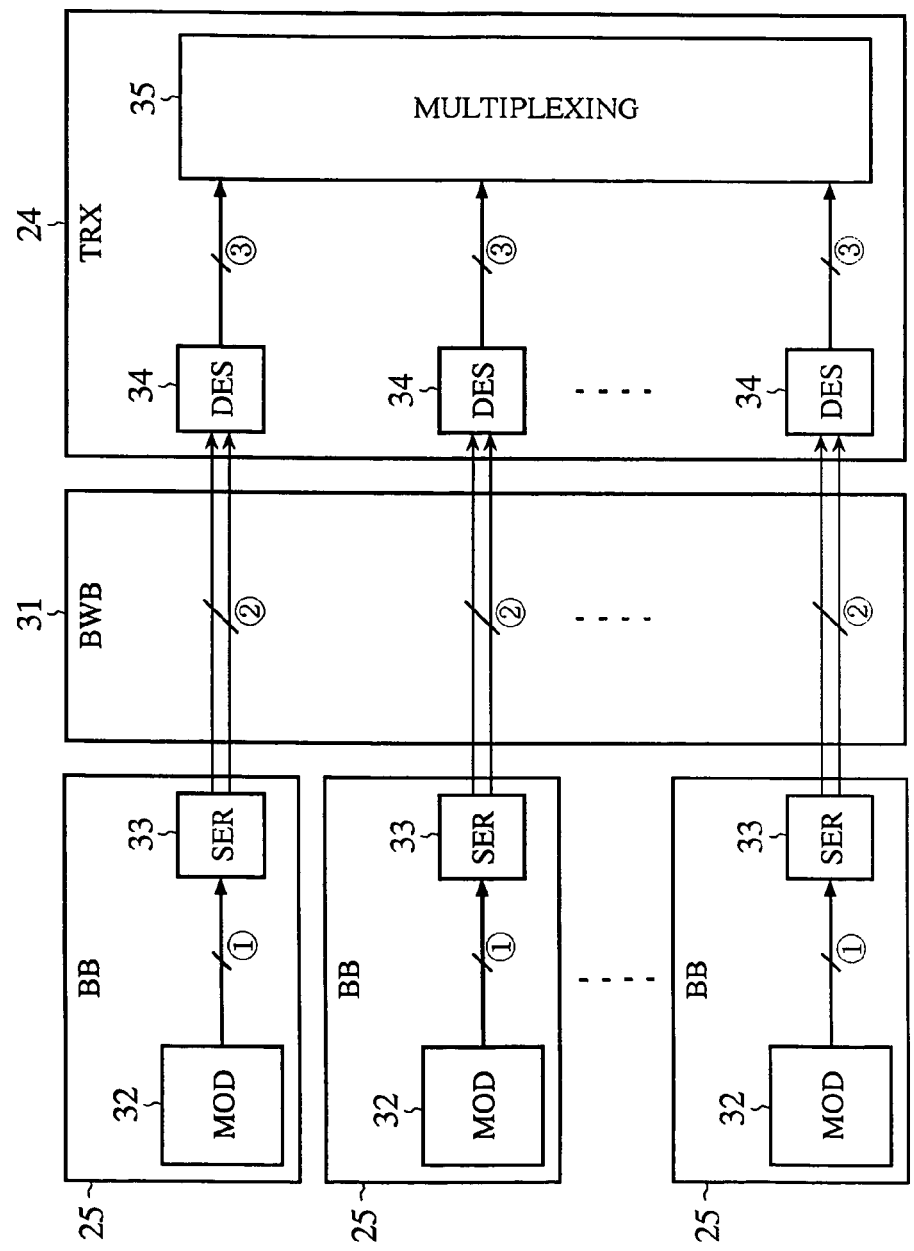
FIG. 4 shows transmission of a downstream signal from a baseband signal processor of FIG. 2 to a radio transmitter and receiver.

FIG. 4 shows downstream signal transmission from the baseband signal processor to the radio transmitter and receiver of FIG. 2. The backwired board 31 disposed between the baseband signal processor 25 and the radio transmission and receiver 24 is a printed circuit board connecting each of the baseband signal processors 25 with a corresponding one of the radio transmitter and receiver 24. Each of the baseband signal processors 25 is provided with a modulator (MOD) 32 and a serializer (SER) 33. The radio transmitter and receiver 24 is provided with a multiplexer 35 and a set of deserializers (DES) 34 each corresponding to the respective one of the baseband signal processors 25.

The signal subjected to spreading modulation by the modulating unit 32 is transmitted to the serializer 33 with a 9-bit width. The serializer 33 converts the modulated signal into a 1-bit width (differential pair) serial data, which is then transferred to the deserializer 34 of the radio transmitter and receiver 24 via the backwired board 31. The deserializer 34 returns the serial data into a 9-bit width signal. The multiplexer 35 multiplexes the signals from the baseband signal processors 25.

By allowing the serializer 33 to convert the downstream signal from the baseband signal processor 25 to the radio transmitter and receiver 24 into a signal having a smaller bit width for high-speed transmission in the backwired board 31, the required width of transmission channel is reduced so that the limited area for wiring is effectively utilized.

Figure 5:
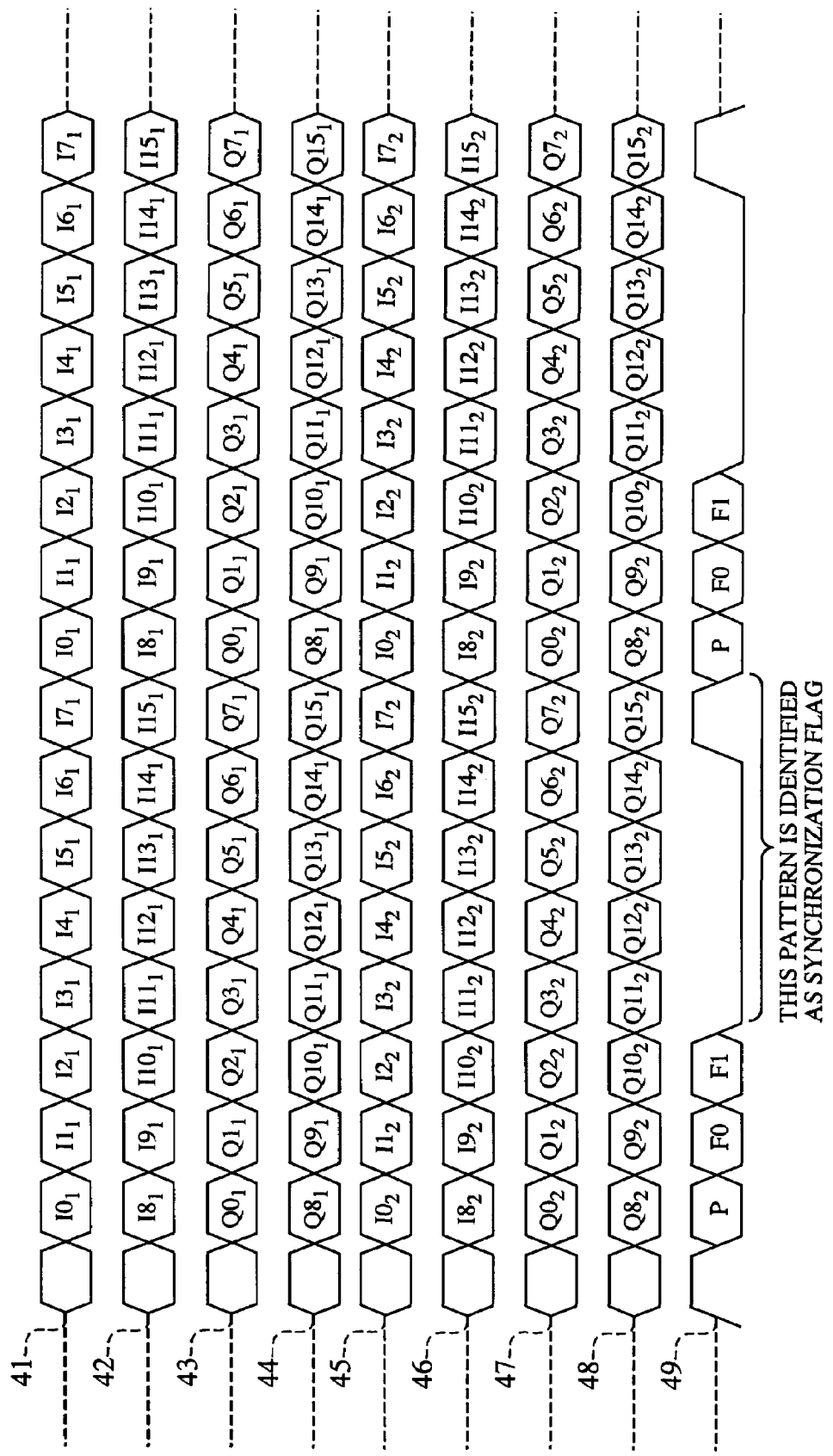
FIG. 5 shows a data format occurring at ① and ③ of FIG. 4.

FIG. 5 shows a data format occurring at ① and ③ of FIG. 4. A first bus line 41 and a second bus line 42 are signal lines for transmitting an I-component via the antenna 21. The first bus line 41 is responsible for a first set of 8 bits and the second bus line 42 is responsible for a second set of 8 bits, the first set and the second set being transmitted alternately over the air. Similarly, a third bus line 43 and a fourth bus line 44 transmit a Q-component signal transmitted via the antenna 21, a fifth bus line 45 and a sixth bus line 46 transmit an I-component signal transmitted via the antenna 22. A seventh bus line 47 and an eighth bus line 48 transmit a Q-component signal transmitted via the antenna 22.

A ninth bus line 49 is a signal line for transmission of a synchronization signal. A parity bit (P) is placed at the head, followed by two bits (F0, F1) for carrier frequency notification. The last 5 bits are used as a synchronization flag.

By outputting the frequency notification signal via the ninth bus line 49, there is no need to provide a separate signal line for frequency notification. Accordingly, the construction of the station is simplified. The parity signal is also output via the ninth bus line 49 for transmission of a synchronization signal. Accordingly, there is no need to provide a separate parity signal line so that the construction of the station is further simplified.

INDUSTRIAL APPLICABILITY

The base transceiver station and radio communication method according to the present invention is applicable to a radio communication system of, for example, a CDMA system.

What is claimed is:

1. A base transceiver station comprising:

a baseband signal processor configured to output a baseband signal and a frequency notification signal indicating a carrier frequency for modulation of the baseband signal, the indicated carrier frequency being obtained based on a carrier frequency having a largest received power intensity at a mobile station during a call process; and a radio transmitter and receiver configured to modulate the baseband signal from said baseband signal processor with the carrier frequency indicated by the frequency notification signal so as to generate a radio transmission signal.

2. The base transceiver station according to claim 1, wherein said baseband signal processor outputs the frequency notification signal to said radio transmitter and receiver via a signal line for transmission of a synchronization signal.

3. The base transceiver station according to claim 2, wherein said baseband signal processor outputs a parity signal to said radio transmitter and receiver via the signal line for transmission of the synchronization signal.

4. A radio communication method comprising assigning one of a plurality of carrier frequencies to a baseband signal, the carrier frequency being assigned based on a carrier frequency having a largest received power intensity at a mobile station during a call process;

transmitting a baseband signal and a frequency notification signal indicating the carrier frequency assigned to the baseband signal, to a radio transmitter and receiver;

generating a radio transmission signal by modulating in the radio transmitter and receiver the baseband signal with the carrier frequency indicated by the frequency notification signal; and transmitting the radio transmission signal thus generated.

5. A base transceiver station comprising:

a baseband signal processor configured to output a baseband signal and a frequency notification signal indicating a carrier frequency for modulation of the baseband signal; and a radio transmitter and receiver configured to modulate the baseband signal from said baseband signal processor with the carrier frequency indicated by the frequency notification signal so as to generate a radio transmission signal, wherein said baseband signal processor outputs the frequency notification signal to said radio transmitter and receiver via a signal line for transmission of a synchronization signal.

6. The base transceiver station according to claim 5, wherein said baseband signal processor outputs a parity signal to said radio transmitter and receiver via the signal line for transmission of the synchronization signal.

* * * * *